US012663526B2

(12) United States Patent
Hériard-Dubreuil et al.

(10) Patent No.: US 12,663,526 B2
(45) Date of Patent: Jun. 23, 2026

(54) METHOD AND DEVICE FOR ANALYSING A MEDIUM

(71) Applicant: E-SCOPICS, Aix-en-Provence (FR)

(72) Inventors: Baptiste Hériard-Dubreuil, Aix-en-Provence (FR); Adrien Besson, Marseilles (FR); Frédéric Wintzenrieth, Aix-en-Provence (FR); Claude Cohen-Bacrie, Aix-en-Provence (FR)

(73) Assignee: E-SCOPICS, Aix-en-Provence (FR)

( * ) Notice: Subject to any disclaimer, the term of this patent is extended or adjusted under 35 U.S.C. 154(b) by 130 days.

(21) Appl. No.: 18/694,824

(22) PCT Filed: Sep. 23, 2022

(86) PCT No.: PCT/EP2022/076533
§ 371 (c)(1),
(2) Date: Mar. 22, 2024

(87) PCT Pub. No.: WO2023/046906
PCT Pub. Date: Mar. 30, 2023

(65) Prior Publication Data
US 2025/0189642 A1 Jun. 12, 2025

(30) Foreign Application Priority Data
Sep. 24, 2021 (FR) ................................. FR2110091

(51) Int. Cl.
*G01S 7/52* (2006.01)
*G01S 15/89* (2006.01)

(52) U.S. Cl.
CPC ...... *G01S 7/52036* (2013.01); *G01S 7/52046* (2013.01); *G01S 15/8977* (2013.01)

(58) Field of Classification Search
CPC ............. G01S 7/52036; G01S 7/52046; G01S 15/8977
See application file for complete search history.

(56) References Cited

U.S. PATENT DOCUMENTS

2025/0189642 A1* 6/2025 Hériard-Dubreuil ........................ G01S 7/52036

FOREIGN PATENT DOCUMENTS

FR 3127585 A1 * 3/2023 ......... G01S 15/8977
WO 2010001027 A1 1/2010
(Continued)

OTHER PUBLICATIONS

L. William & al, "Reflection Matrix Approach for Quantitative Imaging of Scattering Media", 2019.
(Continued)

*Primary Examiner* — Daniel Pihulic
(74) *Attorney, Agent, or Firm* — BCF LLP

(57) ABSTRACT

The present invention relates to a method and device for analysing a medium based on: —emitting plane or spiral emission waves ($O_{inc1}$) each having a respective emission angle, —receiving reception signals representative of plane or spiral reception waves ($O_{rec1}$) each having a respective reception angle, each reception signal including a singly scattered component and a multiply scattered component, —processing the reception signals to extract the singly scattered component and/or the multiply scattered component of said reception signals.

12 Claims, 9 Drawing Sheets

(56) References Cited

FOREIGN PATENT DOCUMENTS

| WO | WO-2016181054 A1 | * | 11/2016 | ......... | G01S 15/8977 |
| WO | WO-2023046906 A1 | * | 3/2023 | ......... | G01S 15/8977 |

OTHER PUBLICATIONS

J. A. Jensen, S. I. Nikolov, K. L. Gammelmark, and M. H. Pedersen, "Synthetic aperture ultrasound imaging," Ultrasonics, vol. 44, pp. e5-e15, 2006.

R. Ali, J. J. Dahl, and N. Bottenus, "Regularized Inversion Method for Frequency-Domain Recovery of the Full Synthetic Aperture Dataset from Focused Transmissions," 2018 IEEE International Ultrasonics Symposium (IUS). 2018, doi: 10.1109/ultsym.2018.8580213.

M. Tanter, J. Bercoff, L. Sandrin, and M. Fink, "Ultrafast compound imaging for 2-D motion vector estimation: application to transient elastography," IEEE Trans. Ultrason. Ferroelectr. Freq. Control, vol. 49, No. 10, pp. 1363-1374, Oct. 2002.

P. Stähli, M. Kuriakose, M. Frenz, and M. Jaeger, "Improved forward model for quantitative pulse-echo speed-of-sound imaging," Ultrasonics, vol. 108, p. 106168, Dec. 2020.

B. A. J. Angelsen, "Instantaneous Frequency, Mean Frequency, and Variance of Mean Frequency Estimators for Ultrasonic Blood Velocity Doppler Signals," IEEE Transactions on Biomedical Engineering, vol. BME-28, No. 11. pp. 733-741, 1981, doi: 10.1109/tbme.1981.324853.

C. Kasai and K. Namekawa, "Real-Time Two-Dimensional Blood Flow Imaging Using an Autocorrelation Technique," IEEE 1985 Ultrasonics Symposium. 1985, doi: 10.1109/ultsym.1985.198654.

T. Loupas, J. T. Powers, and R. W. Gill, "An axial velocity estimator for ultrasound blood flow imaging, based on a full evaluation of the Doppler equation by means of a two-dimensional autocorrelation approach," IEEE Transactions on Ultrasonics, Ferroelectrics and Frequency Control, vol. 42, No. 4. pp. 672-688, 1995, doi: 10.1109/58.393110.

J. A. Jensen, S. I. Nikolov, A. C. H. Yu, and D. Garcia, "Ultrasound Vector Flow Imaging—Part I: Sequential Systems," IEEE Trans. Ultrason. Ferroelectr. Freq. Control, vol. 63, No. 11, pp. 1704-1721, Nov. 2016.

B. Y. S. Yiu, S. S. M. Lai, and A. C. H. Yu, "Vector Projectile Imaging: Time-Resolved Dynamic Visualization of Complex Flow Patterns," Ultrasound in Medicine & Biology, vol. 40, No. 9. pp. 2295-2309, 2014, doi: 10.1016/j.ultrasmedbio.2014.03.014.

B. Dunmire, K. W. Beach, K. Labs, M. Plett, and D. E. Strandness Jr, "Cross-beam vector Doppler ultrasound for angle-independent velocity measurements," Ultrasound Med. Biol., vol. 26, No. 8, pp. 1213-1235, Oct. 2000.

* cited by examiner

D

Reception Angle

Transmission Angle

D'

ROTATING — 101

FILTERING — 102

INVERSE ROTATING — 103

METHOD AND DEVICE FOR ANALYSING A MEDIUM

FIELD OF THE INVENTION

This invention relates to the general technical field of the analysis of a medium by propagation of waves, and particularly sound or ultrasound, or electromagnetic waves.

More precisely, this invention relates to a method and device for analyzing a target object, or a scattering medium such as a biological, human or animal tissue.

This analysis may consist in:

the estimate of a characteristic parameter of the medium, and/or the detection of a singular point of the medium, and/or the production of an image of the medium.

In the remainder of the text, this invention will be described with reference to ultrasound medical imaging, it being understood that the teachings described here can be used in other types of application (non-medical ultrasounds, SONAR, RADAR, etc.) using waves of controllable amplitude, frequency and phase (i.e. coherent waves).

BACKGROUND OF THE INVENTION

1. General Principle of Scattering

Different solutions are known for analyzing a medium using the principle of scattering of a wave. In order to simplify the explanation, a discrete description is used here although the reality of scattering is continuous.

With reference to FIG. 1, scattering is a phenomenon by which a wave $U_E$ is deviated and redistributed in various directions $U_1$, $U_2$, P, $Ech_1$ by an interaction with a "scattering object" $Ob_1$ contained in a medium.

Analysis solutions generally consist in:

transmitting, using a transmitter E, an excitation wave $U_E$ through the medium to be analyzed, receiving, using a receiver R, acoustic echoes $Ech_1$, $Ech_2$ following the scattering of the incident excitation wave $U_E$ by one (or more) scattering object(s) $Ob_1$, $Ob_2$ contained in the medium and converting them into reception signals, processing the reception signals to extract information about the medium.

The reception signals are composed of two components:

a so-called "single scattering" component, and a so-called "multiple scattering" component.

More precisely and as previously recalled, the scattering of the wave causes its deviation and redistribution along various directions, such that certain parts P of the deviated wave can interact with other scattering objects $Ob_2$ contained in the medium before being received by the receiver R.

The parts $Ech_1$ of the deviated wave which are sensed by the receiver R before interacting with other scattering objects $Ob_2$ constitute the single scattering component.

The parts $Ech_2$ of the deviated beam which are sensed by the receiver R after interacting with several receiver items $Ob_1$, $Ob_2$ constitute the multiple scattering component. Here the description is limited to 2 scattering items but can of course be generalized to cover a larger number of scatterers.

Solutions of analysis of a medium generally use the single scattering component of the reception signals (at each given time of reception of an echo, the measurement of the time elapsed between the transmission and the reception of its associated single scattering component is representative of the position of the scattering object).

However, the single scattering component being combined with the multiple scattering component, these techniques are not applicable to media including a large number of scattering objects $Ob_1$, $Ob_2$, or if the scatterers present in the medium have a high scattering power.

2. WO 2010/001027

To palliate this drawback, provision has been made in the document WO 2010/001027 for a method making it possible to separate the single and multiple components of the reception signals using a technique for filtering an inter-element impulse response matrix by projection or by single value decomposition.

This method is based on the following steps:

i) recording of inter-element responses for each transmitter/receiver pair of a transmitter/receiver set, ii) determining a time-windowed inter-element response matrix K based on inter-element responses, each element/coefficient $K_{i,j}$ of the time-windowed inter-element response matrix K corresponding to the signal received by a receiver n°j following the transmission of a wave by the transmitter n°i, iii) processing the time-windowed inter-element response matrix K, the processing step consisting in separating:

the multiple scattering component, from the single scattering component, in the time-windowed inter-element response matrix K as a function of the coherence of the coefficients of the time-windowed inter-element response matrix along each antidiagonal of said time-windowed inter-element response matrix K.

2.1. Recording Step

With reference to FIGS. 2a to 2d, the principle of recording an inter-element response of a transmitter/receiver pair of a transmitter/receiver set $E_1$-$E_n$/$R_1$-$R_n$ is as follows.

An incident wave Inc corresponding to an impulse signal is sent from each transmitter ($E_1$ on FIGS. 2a to 2c, $E_2$ on FIG. 2d, etc.) during a transmission step, and the wave Ref reflected by the medium following the transmission of this incident wave Inc, is recorded by each receiver ($R_1$ on FIG. 2a, $R_2$ on FIG. 2b, $R_n$ on FIG. 2c, etc.) during a measuring step.

These transmitting and measuring steps are reiterated for all the possible transmitter/receiver pairs ($E_1$, $R_1$), ($E_1$, $R_2$), ($E_1$, $R_n$), ($E_2$, $R_1$), ... ($E_n$, $R_n$) of the transmitter/receiver set in order to record all the inter-element responses of the transmitter/receiver set.

To limit the time needed to acquire the transmitter/receiver pairs ($E_1$,$R_1$), ($E_1$, $R_2$), ($E_1$, $R_n$), ($E_2$, $R_1$), ... ($E_n$, $R_n$), each transmitter $E_1$ (or $E_2$, or $E_n$ respectively) of the transmitter set $E_1$-$E_n$ can be activated in succession, the set of receivers $R_1$-$R_n$ being activated simultaneously in reception mode for the simultaneous acquisition of a set of pairs ($E_1$, $R_1$), ($E_1$, $R_2$), ($E_1$, $R_n$) (or respectively ($E_2$, $R_1$), ($E_2$, $R_2$), ($E_2$, $R_n$), or respectively ($E_n$, $R_1$), ($E_n$, $R_2$), ($E_n$, $R_n$)) associated with the transmission of an incident wave by the activated transmitter $E_1$ (or respectively $E_2$, or respectively $E_n$).

2.2. Determination of the Response Matrix

Physically, the principle of construction of a row "i" of a time-windowed inter-element response matrix K consists:

for the transmitter n°i, in transmitting an ultrasound wave (transmitter $E_1$ in the case of FIGS. 2a to 2c), for each receiver n°j of the set of receivers, in receiving
an acoustic echo and converting it into an associated
time-dependent reception signal ($R_1$-$R_n$ in the case of
FIGS. 2a to 2c), truncating (i.e. windowing) the time-dependent reception
signals into a time window of duration $\Delta t$ and centered
around a time t (which can for example correspond to
a time of flight of the ultrasound wave to reach a depth
of interest in the medium).

These steps are repeated for each row of the matrix. More
precisely, once all the receivers $R_1$-$R_n$ of the transmitter/
receiver set have received an acoustic echo and the reception
signals have been windowed, the row "i" of the inter-
element matrix is determined.

The construction of the row "i+1" of the inter-element
matrix can then be initiated by activating the transmitter
n°i+1 of the transmitter/receiver set ($E_2$ in the case of FIG.
2d) to transmit an ultrasound wave, by activating all the
receivers n°j of the transmitter/receiver set to respectively
receive an acoustic echo and convert it into an associated
time-dependent reception signal, and by windowing the
reception signals.

2.3. Drawbacks of WO 2010/001027

However, to obtain the antidiagonal coefficients of the
inter-element matrix according to the method in WO 2010/
001027, many approximations are made.

Specifically, the shape of the inter-element matrix is not
totally antidiagonal, as illustrated in FIG. 3 where a behavior
more complex than simple constancy along the antidiago-
nals is observed. The antidiagonals do indeed appear curved,
which can be taken into account in the model but signifi-
cantly complicates it.

These approximations impair the quality of separation of
the single and multiple scattering components.

Another drawback described in the method WO 2010/
001027 relates to the large number of successive wave
transmissions needed to acquire the transmitter/receiver
pairs.

Specifically, during the acquisition of these transmitter/
receiver pairs, the transmitter/receiver set and the medium
must remain immobile with respect to one another in order
to guarantee that the reception signals acquired by all the
receivers are representative of one and the same environ-
ment (i.e. an environment that has not changed, particularly
in terms of position).

However, a transmitter/receiver set conventionally com-
prises 128 elements or more.

With the method as per WO 2010/001027, the position of
the medium must remain invariant during the implementa-
tion of the 128 successive transmissions and the 128 asso-
ciated receptions.

This can be difficult to achieve, for example when the
medium is an organ of a living patient, and/or when the
transmitter/receiver set is incorporated into a probe handled
by a practitioner.

A final drawback of the method described in WO 2010/
001027 relates to the low signal-to-noise ratio as well as the
low penetration of the transmission achieved with an ele-
ment.

This can significantly limit the depth exploitable by such
a method.

From the document XP255911387, a method is also
known for quantifying single and multiple scattering ratios
of ultrasound signals by observing the features of an impulse
response matrix between virtual transducers located inside
the medium. The method as per XP255911387 is similar to
the method of WO 2010/001027 in that it processes inter-element matrices, but differs in that the elements of
XP255911387 are virtual and located in the medium, at a
studied depth. It therefore has the same drawbacks as the
document WO 2010/001027.

One aim of this invention is to make provision for a
method and a device for analyzing a medium for remedying
at least one of the aforementioned drawbacks.

BRIEF DESCRIPTION OF THE INVENTION

For this purpose, the invention makes provision for a
method for analyzing a medium based on a (virtual) trans-
ducer array, said method comprising:

generating in a scattering medium, by transducers of the
array, a plane (or spiral) wave having a desired trans-
mission angle in relation to the transducer array, receiving, by transducers of the array, reception signals
and their combinations to obtain result signals repre-
sentative of several plane (or spiral) reception waves
reverberated by the scattering medium, said plane (or
spiral) reception waves having respective reception
waves in relation to the array, the signals resulting from
these plane (or spiral) reception waves comprising:

a single scattering component, representative of wave
paths resulting from a single reflection of the plane
(or spiral) transmission wave off a scatterer of the
scattering medium, a multiple scattering component, representative of
wave paths resulting from several successive reflec-
tions of the plane (or spiral) transmission wave off
scatterers of the scattering medium before reaching
the transducers of the transducer array, repeating the steps of generating and receiving for a
plurality of plane (or spiral) transmission waves, each
having an associated transmission angle, processing the reception signals to determine features of
the medium, noteworthy in that the processing phase
comprises a step of separating the single scattering
component and the multiple scattering component, in
said reception signals.

Advantageously, the separating step can include a sub-
step of filtering at least one windowed inter-angle matrix
representative of the transmission and reception angles of
the (plane or spiral) transmission and reception waves:

row of the windowed inter-angle matrix being represen-
tative of the transmission angle of a (plane or spiral)
transmission wave, and each column of the windowed inter-angle matrix being
representative of a reception angle of a (plane or spiral)
reception wave;

The invention also relates to a method for analyzing a
medium based on an array of transducers, noteworthy in that
the method comprises the following phases:

the generation in a scattering medium, by transmitter/
receivers of the array, a plane transmission wave having
a desired transmission angle, the reception, by transducers of the array, of reverberated
signals and their combinations to obtain reception
signals representative of several reception plane waves
reflected by the scattering medium according to respec-
tive reception angles, each reception signal comprising:

a single scattering component, representative of wave
paths resulting from a single reflection of the plane
transmission wave off a scatterer of the scattering
medium, a multiple scattering component, representative of
wave paths resulting from several successive reflections of the plane transmission wave off scatterers of the scattering medium before reaching the transmitter/receivers of the transducer array, repeating the generating and receiving steps for a plurality of transmission plane waves each having an associated transmission angle, processing the reception signals to determine features of the medium, the processing phase comprising a step of separating the single and multiple scattering components in the reception signals, said separating step including the following sub-steps:

determining at least one windowed inter-angle matrix in which each row is representative of the transmission angle of a plane transmission wave and each column is representative of the angle of reception of a plane reception wave, filtering the at least one windowed inter-angle matrix to separate the single scattering component and the multiple scattering component in each reception signal.

The use of directional waves at desired angles in transmission and reception mode makes it possible to improve the quality of separation of the single scattering component from the multiple scattering component of the reception signals.

In particular, the use of such transmitted and received waves at desired transmission and reception angles makes it possible to generate an inter-angle matrix:

each row of which is representative of the transmission angle of a transmitted plane wave, and each column of which is representative of a reception angle of a received plane wave.

Such an inter-angle matrix has straight antidiagonals (as will be described in more detail below), unlike the antidiagonals of an inter-element matrix (as described in WO 2010/001027 or in XP255911387) which are curved. This linearity of the antidiagonals of the inter-angle matrix makes it possible to improve the quality of separation of the single and multiple scattering components of the reception signals.

In the remainder of the text, there will be a description of different examples of phases of processing of this inter-angle matrix, it being understood by those skilled in the art that the phase of processing of the inter-angle matrix can be of any type known thereby.

Preferred but non-limiting aspects of the invention are as follows:

each generating step may comprise the sub-step consisting in:

activating in transmission mode the transducers of the array according to a respective activation delay law, such that each transducer transmits an elementary ultrasound wave at a respective time as a function of said activation delay law, said elementary ultrasound waves combining to form the (plane or spiral) transmission wave having the desired transmission angle, the transmission angle of the (plane or spiral) transmission wave depending on the activation delay law used;

each receiving step may comprise the sub-steps consisting in:

activating in reception mode the transducers of the array according to a respective activation delay law, such that each transducer records an elementary received signal corresponding to a portion of the (plane or spiral) reception wave having a desired reception angle, the desired reception angle depending on the activation delay law used.

combining the elementary received signals to form a reception signal corresponding to the (plane or spiral) reception wave having the desired reception angle;

each receiving step may comprise the sub-steps consisting in:

simultaneously activating the transducers in reception mode, each transducer recording a sensed signal representative of several waves reverberated by the medium, combining the sensed signals according to different time delay laws to form reception signals representative of the (plane or spiral) reception waves, said sub-step consisting in combining the signals comprising, for each reception signal representative of a (plane or spiral) reception wave having a desired reception angle, the following phases:

for each sensed signal, time-shifting the sensed signal as a function of a time delay law to obtain a shifted signal, each time delay law used being associated with a respective desired reception angle, summing the shifted signals to obtain a reception signal representative of the (plane or spiral) reception wave having the desired reception angle;

the separating step may also comprise the following sub-steps:

determining a plurality of windowed inter-angle matrices, each windowed inter-angle matrix corresponding to a time matrix defining, over a time window in the vicinity of a time T and of duration $\Delta t$, pairs of transmission and reception angles of (plane or spiral) waves, then for each windowed inter-angle matrix:

estimating a first resultant inter-angle matrix representative of the single scattering component, estimating a second resultant inter-angle matrix representative of the multiple scattering component;

advantageously, for each windowed inter-angle matrix:

the sub-step of estimating a first resultant inter-angle matrix representative of the single scattering component may consist in computing a Hankel matrix based on the windowed inter-angle matrix under consideration, said Hankel matrix having constant coefficients along each ascending antidiagonal, the sub-step of estimating a second resultant inter-angle matrix representative of the multiple scattering component may consist in subtracting the estimated Hankel matrix from the windowed inter-angle matrix;

the Hankel matrix may consist in a single matrix having the most similarities, according to a Frobenius norm, with the windowed inter-angle matrix under consideration;

for each windowed inter-angle matrix, the sub-steps of estimating the first and second resultant inter-angle matrices may comprise the filtering of the windowed inter-angle matrix under consideration as a function of the coherence of the coefficients along each ascending diagonal of said windowed inter-angle matrix under consideration;

the filtering of the windowed inter-angle matrix may comprise:

the rotation of the inter-angle matrix by an angle of 45° to obtain at least one pivoted matrix, the decomposition into at least one single value of each pivoted matrix to obtain a decomposed matrix,

the subtraction of the decomposed matrix from said pivoted matrix to obtain a subtracted matrix, the inverse rotation of the decomposed matrix by an angle of −45° to obtain the first resultant inter-angle matrix representative of the single scattering component, the inverse rotation of the subtracted matrix by an angle of −45° to obtain the second resultant inter-angle matrix representative of the multiple scattering component;

in a variant embodiment, the transducer array may comprise a plurality of transducers extending along at least one row such as to have a substantially plane shape:

the wave generated during the generating step consisting in a plane wave, the signals combined during the receiving step being representative of plane reception waves, each activation delay law consisting in a linear delay law applied to the transducers extending along at least one row;

in another variant embodiment, the transducer array may comprise a plurality of transducers extending along at least one radius of curvature such as to have a convex shape:

the wave generated during the generating step consisting in a spiral wave, the signals combined during the receiving step being representative of spiral reception waves, each activation delay law consisting in a linear delay law applied to the transducers extending along at least one radius of curvature.

BRIEF DESCRIPTION OF THE DRAWINGS

Other advantages and features of the probe according to the invention will become more clearly apparent from the following description of several variants of execution, given by way of non-limiting example, based on the appended drawings on which.

DETAILED DESCRIPTION OF THE INVENTION

A more detailed description will now follow of different embodiments of the method and device for analyzing a medium according to the invention with reference to the figures. In these different figures, equivalent components are designated by the same reference number.

In the remainder of the text, the invention will be described with reference to the field of ultrasound imaging of the human body. It is of course obvious to those skilled in the art that the method and device for analyzing a medium according to the invention can be used for other applications, such as SONAR or RADAR applications, or other non-medical applications (seismography, analysis of materials such as concrete or polycrystalline materials, etc.).

1. DEVICE FOR ANALYZING A MEDIUM

Figure 4:
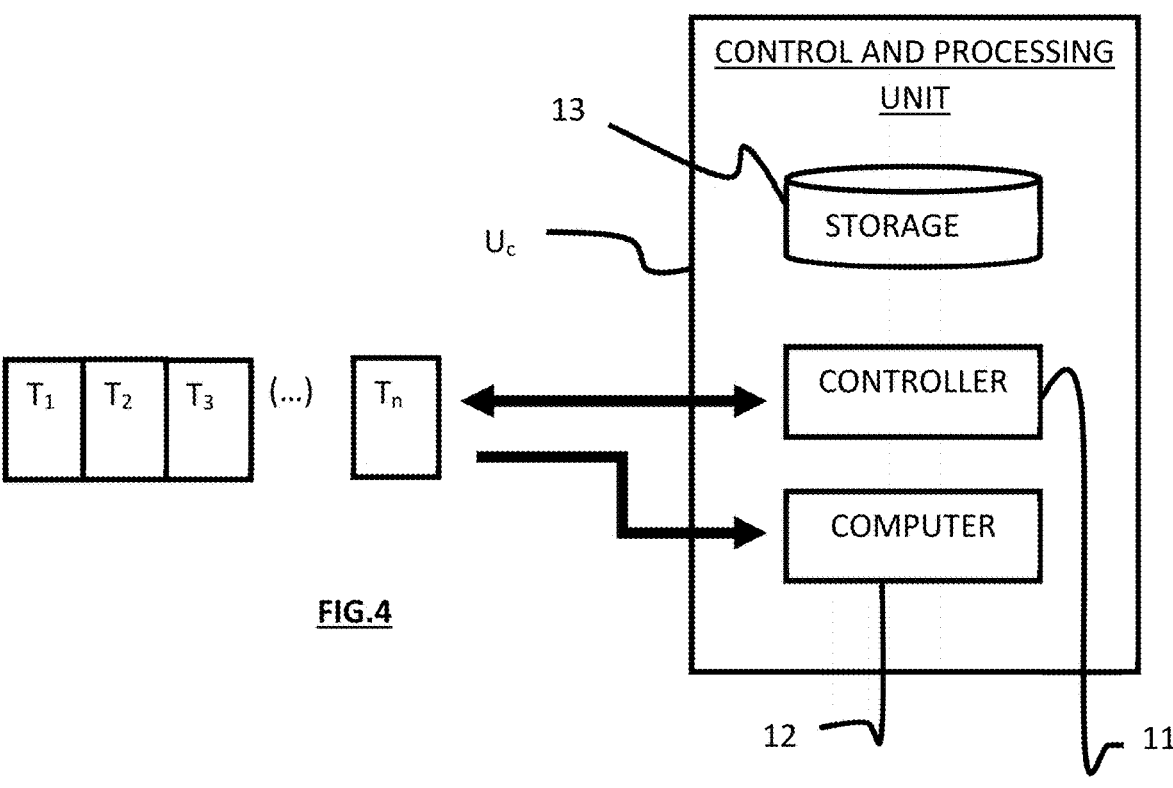
FIG. 4 is a schematic representation of an ultrasound imaging device including an acquiring probe and one (or more) computing units.

FIG. 4 illustrates an example of a device in which the method for analyzing a medium described in the remainder of the text can be implemented.

This device comprises:

a transducer array $T_1$-$T_n$ for acquiring signals, and a control and processing unit $U_c$ for:

driving the transducer array $T_1$-$T_n$ and processing the signals acquired by the transducer array $T_1$-$T_n$.

1.1. Transducer Array

The transducer array $T_1$-$T_n$ comprises a set of "n" ultrasound transducers ("n" being an integer greater than or equal to one) disposed linearly. In a variant, the transducers $T_1$-$T_n$ of the array can be disposed in a curve, or in concentric circles, or in a matrix.

The transducer array $T_1$-$T_n$ makes it possible to transmit ultrasound excitation waves toward a medium to be analyzed (organ, biological tissue, etc.), and to receive acoustic echoes (i.e. ultrasound waves reflected by the medium to be analyzed).

Each transducer $T_1$-$T_n$ consists for example in a plate of piezoelectric material of rectangular shape coated on its front and rear faces with electrodes and covered on the front face with lenses and acoustic impedance matching layers. Such transducers are known to those skilled in the art and will not be further described in the remainder of the text.

In the variant embodiment illustrated in FIG. 4, all the transducers $T_1$-$T_n$ of the array are used both in transmission and in reception mode. In other embodiments, separate transducers can be used for transmission and reception.

1.2. Control and Processing Unit

The control and processing unit $U_c$ is connected to the transducer array $T_1$-$T_n$.

It is used to drive the transducers $T_1$-$T_n$ of the array, and to process the data acquired by the transducers $T_1$-$T_n$ of the array.

More precisely, the control and processing unit $U_c$ is used to:

command the transducers $T_1$-$T_n$ to transmit ultrasound waves toward the medium to be analyzed, command the transducers $T_1$-$T_n$ to receive echoes reflected by the medium to be analyzed and to convert them into reception signals, process the reception signals.

The control and processing unit $U_c$ can be composed of one or more separate physical entities, where applicable remote from the transducer array $T_1$-$T_n$.

The control and processing unit $U_c$ for example comprises:

one or more controllers 11, such as a Smartphone, a PDA (or Personal Digital Assistant), or any type of mobile terminal known to those skilled in the art; and one or more computers 12, such as personal computers, one or more microcomputers, one or more workstations, and/or other devices known to those skilled in the art including one or more processors, one or more microcontrollers, one or more programmable logic controllers, one or more application-specific integrated circuits, and/or other programmable circuits.

one or more storage units 13 including one or more memories which can be a ROM/RAM memory, a USB stick, a memory of a central server.

Besides the conservation of data associated with the analysis of a medium, the storage unit 13 can also be used to store programming code instructions intended to execute the steps of the analyzing method described in the remainder of the text.

2. ANALYZING METHOD

2.1. General Remarks

Figure 11:
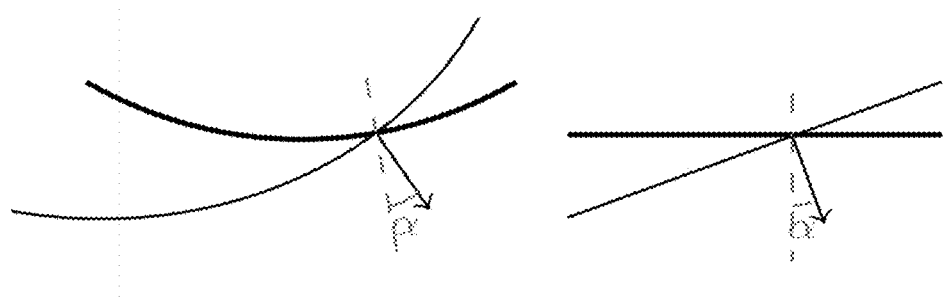
FIG. 11 is a schematic representation of plane and spiral waves transmitted by plane and curved transducer arrays.

One of the advantageous aspects of the analyzing method according to the invention relates to the use of specific waves in transmission mode and in reception mode, here known as plane waves and spiral waves. Such waves are illustrated in FIG. 11. More precisely, FIG. 11 illustrates:

a plane wave $O_P$ transmitted by a plane transducer array $T_P$, a spiral wave $O_S$ transmitted by a curved transducer array $T_C$.

It is obvious to those skilled in the art that the type of wave is independent of the shape of the transducer array. In particular, a plane transducer array can be configured to transmit a spiral wave (using an appropriate delay law). Similarly, a curved transducer array can be configured to transmit a plane wave (using an appropriate delay law).

More generically, an array of virtual transducers T is defined as a set of points of the medium disposed on a line or in a semicircle. The features of the plane or spiral wavefronts are chosen (in particular the transmission or reception angle) with respect to this array of virtual transducers. The delay laws applied to the array of real transducers are deduced therefrom. As part of the approximation of the wavefront, everything happens as if the waves were transmitted by the array of virtual transducers. Thus, whatever the geometry of the probe, any type of plane or spiral wave can be transmitted by defining an array of corresponding virtual transducers.

The term "plane wave" $O_P$ refers to a wave in which the time of arrival of the wavefront at a depth z depends on the lateral position x according to an affine law $t(x, z)=a(z)+bx$ where a is a constant which depends only on z and b a constant that depends neither on z nor on x.

Similarly, the term "spiral wave" $O_S$ refers to the equivalent of the plane wave $O_P$ in a polar frame of reference. A polar frame of reference is then chosen arbitrarily, and the spiral wave $O_S$ is defined as the wave, for which the time of arrival of the wavefront at a radius r depends on the angle $\theta$ according to an affine law $t(r, \theta)=a(r)+b\theta$ where a is a constant that depends only on r and b is a constant that depends neither on r nor on $\theta$. Those skilled in the art will note that the plane wave $O_P$ corresponds to a limit case of the spiral wave where the origin of the frame of reference moves infinitely far away from the probe.

These waves are generated in transmission or in reception mode by the real transducer array $T_1$-$T_n$ by applying to each transducer the delay corresponding to the time of arrival of the wavefront at the position of said transducer.

In the context of this invention, the term "transmission angle" (or "reception angle" respectively) should be understood to mean a the angle between:

a direction orthogonal (hereinafter known as "normal") to the tangent to the transducer array $T_1$-$T_n$, and a direction normal to the tangent to the wavefront of the wave transmitted (or received respectively) using the transducer array $T_1$-$T_n$, at the time of transmission (or reception respectively).

These plane or spiral waves $O_P$, $O_S$ can be generated independently of the geometry of the probe used. It will be noted that in the case where the virtual transducer array is equivalent to the real transducer array (plane waves in linear probes or spiral waves in curved probes), the transmission (or reception respectively) of such waves is simplified by the similarity between the geometry of the probe and the shape of the wavefront. It is also more advantageous from the point of view of the directivity of the elements.

The inter-angle matrix defines plane or spiral transmission and reception angle pairs.

More precisely, each coefficient of the inter-angle matrix corresponds to a reception angle (for example the set of transducers $T_1$-$T_n$ of the array) of a plane or spiral reflected wave following the reverberation in the medium of a plane or spiral transmission wave of a transmission angle.

The subsequent processing of this inter-angle matrix to separate the single and multiple scattering components in the reception signals measured by the transducers specifically makes it possible to obtain better results than the method described in WO 2010/001027 (based on the separation of the single and multiple scattering components in an inter-element matrix).

A more detailed description will now follow of the steps of obtaining of the inter-angle matrix. For simplicity's sake, these steps are described for the scenario of plane waves, with a linear probe. This method can however be generalized to cover other probe geometries and spiral waves.

2.2. Obtaining the Inter-Angle Matrix

2.2.1. Generating Plane Transmission Waves

To generate a plane transmission wave, the transducers $T_1$-$T_n$ of the array are activated together (in transmission mode) such that the elementary waves $EI_1$-$EI_n$ generated by each of the transducers $T_1$-$T_n$ combine to form a plane transmission wave having a desired transmission angle.

Figure 5:
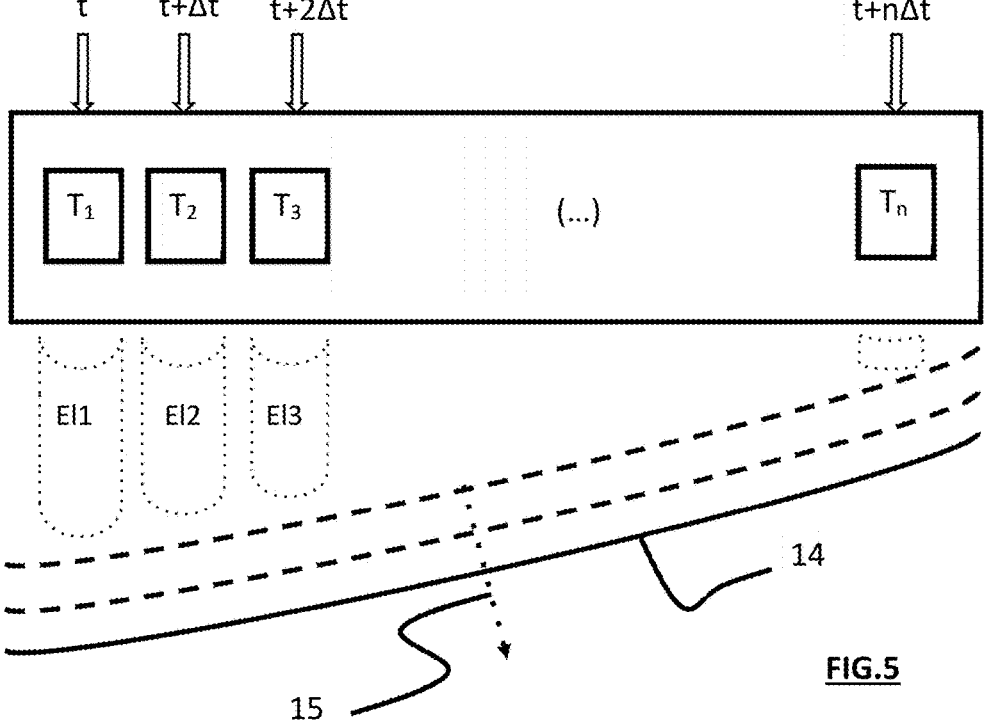
FIG. 5 is a schematic representation illustrating the principle of transmission of a plane wave from an array of transducers.

More precisely, as a function of the phase and amplitude of the excitation voltages applied to the transducers $T_1$-$T_n$ by the control and processing unit $U_c$, it is possible to control the transducers $T_1$-$T_n$ so that they produce elementary ultrasound waves $EI_1$-$EI_n$ combining to form a plane ultrasound transmission wave 14 which propagates through the medium to be analyzed along a desired direction 15 (see FIG. 5).

This resultant plane ultrasound wave 14 can be transmitted at different transmission angles (i.e. different directions) by varying the activation times (t, t+$\Delta$t, t+2$\Delta$t, . . . t+n$\Delta$t) of each transducer $T_1$-$T_n$ of the array.

For example, for the generation of a plane transmission wave, all the transducers $T_1$-$T_n$ can be activated:

simultaneously to obtain a plane transmission wave propagating along a zero angle of transmission relative to the transducer array $T_1$-$T_n$, or in succession (as a function of an activation delay law) to obtain a plane transmission wave propagating at a non-zero transmission angle in relation to the transducer array $T_1$-$T_n$.

Whatever the circumstances, the transducers $T_1$-$T_n$ are activated together to generate the plane wave, i.e. the transducers $T_1$-$T_n$ are all activated in transmission mode for each reception.

2.2.2. Reception of Plane Waves

For the reception of plane waves, two separate solutions may be envisioned.

These two solutions—which will be described in the remainder of the text—can be used as part of this invention.

2.2.2.1. First Solution

The first solution consists in applying a delay law in the activation (in reception mode) of the transducers $T_1$-$T_n$ of the array.

More precisely, to receive a plane reception wave having a desired reception angle, the transducers $T_1$-$T_n$ of the array are activated together (in reception mode), the plane reception wave corresponding to the sum of the reception signals acquired by the transducers $T_1$-$T_n$ of the array:

simultaneously, to receive a plane reception wave having a zero reception angle (i.e. with a wavefront that has a zero angle, in relation to the normal to the transducer array $T_1$-$T_n$), successively, observing an activation delay law (in reception mode) to receive a plane reception wave having a non-zero desired reception angle (i.e. with a wavefront that has a non-zero angle in relation to the normal to the transducer array $T_1$-$T_n$).

For each plane wave in transmission, the activation of the transducers $T_1$-$T_n$ of the array in reception mode must then be repeated N times with separate activation delay laws (in reception mode) for the acquisition of N plane reception waves having separate reception angles (i.e. for which the respective wavefronts have separate angles in relation to the normal to the transducer array $T_1$-$T_n$).

This can be expensive in terms of time and hardware resources. Moreover, this solution can be difficult to implement since the medium must remain immobile for all the acquisitions of plane reception waves.

2.2.2.2. Second Solution

To limit the quantity of data acquired by the transducers $T_1$-$T_n$, and reduce the time needed to acquire plane reception waves at different reception angles, the inventors have developed a second solution in which the transducers $T_1$-$T_n$ acquire the signals representative of the plane reception waves simultaneously, independently of their orientation (i.e. independently of the directions of travel of their wavefronts).

Thus, after the transmission of a plane transmission wave having a given transmission angle, each transducer is activated simultaneously in reception mode to record sensed signals representative of the reverberation by the medium of the plane transmission wave.

For each transducer $T_1$-$T_n$, a sensed signal which is a function of time t, $\{s_i(t)\}_{0 \le i \le n-1}$ is recorded.

The signals sensed by the transducers $T_1$-$T_n$ are then summed according to a time delay law dependent on the desired reception angle for the plane reception wave.

For example, to receive a plane reception wave having a reception angle $\alpha$ based on the sensed signals $\{s_i(t)\}_{0 \le i \le n-1}$ measured by the transducers $T_1$-$T_n$, the following summation operation is performed:

$$\widetilde{s\alpha(t)} = \sum_{i=0}^{n-1} s_i \left( t - \frac{ip\sin\alpha}{c} \right)$$

12

Where:

"c" represents the velocity of the wave in the medium,

"p" represents the pitch of the probe (i.e. separation between two adjacent transducers of the transducer array).

The processing of the block of sensed signals is used to "reorient" the responses recorded by the different transducers $T_1$-$T_n$ to obtain the reception waves at the different desired reception angles. N plane waves are thus generated in reception mode from a single transmission.

2.2.3. Determination of Windowed Inter-Angle Matrices

Figures 6A, 6B, 6C, 6D:
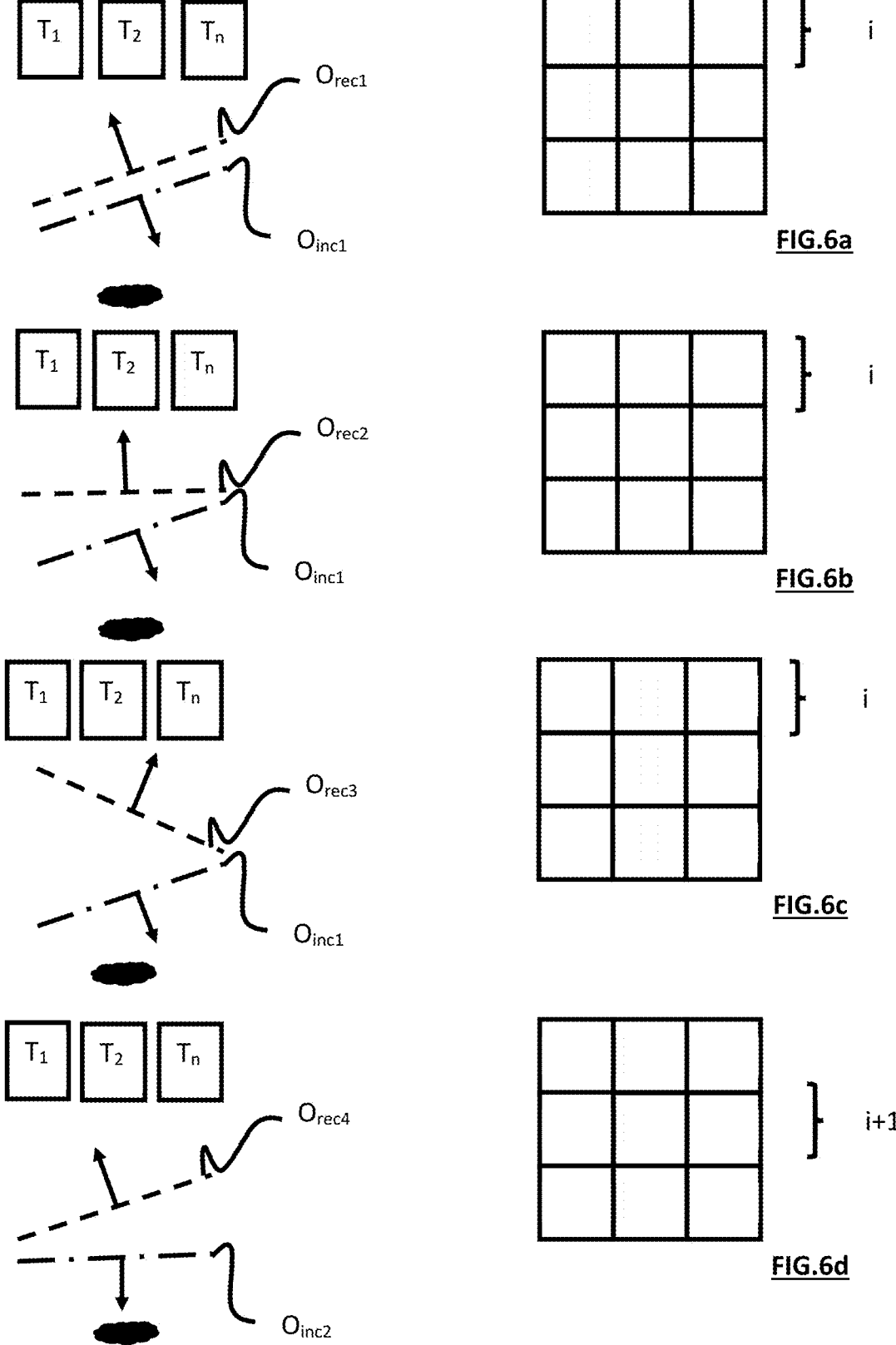
FIGS. 6a to 6d are schematic representations illustrating the principle of determination of an inter-angle matrix.

With reference to FIG. 6a, the principle of construction of a coefficient $K_{i,j}$ of a row "i" of a time-windowed inter-angle matrix K(T) comprises the following steps:

for the transducers $T_1$-$T_n$ of the array, transmitting a plane transmission wave $O_{inc1}$ having a desired transmission angle (each transducer being activated according to a predetermined activation delay law to generate the plane wave $O_{inc1}$ having the desired transmission angle), for the transducers $T_1$-$T_n$ of the array, receiving a plane reception wave $O_{rec1}$ having a desired reception angle (obtained by implementing either the first solution or the second solution).

The reception signal representative of the plane reception wave having the desired reception angle is time-dependent.

This signal is truncated (windowed) into successive time windows $F_T$ (potentially partially superimposed)—of duration $\Delta t$—each associated with a respective inter-angle matrix. Each time window $F_T$ is centered around a time "T" which can be representative of a depth P in the medium (according to the relationship P=cT/2, with "c" the velocity of the ultrasound wave in the medium).

For each time window $F_T$, the corresponding truncated reception signal is multiplied by a windowing function and recorded in the coefficient $K_{i,j}$ of the associated windowed inter-angle matrix K(T).

As illustrated in FIGS. 6b and 6c, the row "i" of each windowed inter-angle matrix K(T) is completed by receiving plane reception waves $O_{rec2}$, $O_{rec3}$ each having a separate angle of reception from the other plane reception waves and by truncating the reception signals representative of the plane reception waves $O_{rec2}$, $O_{rec3}$ into successive time windows $F_T$.

These steps are repeated for each row of the matrix K(T).

More precisely, once all the plane reception waves have been received and truncated for all the desired reception angles, the row "i" of each windowed inter-angle matrix K(T) is determined.

With reference to FIG. 6d, the construction of the row "i+1" of each windowed inter-angle matrix K(T) can be initiated:

by generating a new plane transmission wave $O_{inc2}$ have a separate transmission angle from the transmission angle associated with the plane transmission wave $O_{inc1}$ used for the preceding row "i", by receiving the plane reception waves $O_{rec4}$, etc. having the separate desired reception angles, and by truncating the reception signals representative of the plane reception waves $O_{rec4}$, etc. into successive time windows $F_T$.

Thus in each windowed inter-angle matrix K(T):

each row "i" is representative of the transmission angle of a transmitted plane wave, and each column "j" is representative of a reception angle of a received plane wave.

In the context of this invention, the windowed inter-angle matrices K(T) under consideration are acquired with transmission and reception angles spaced apart by a constant pitch.

2.2.4. Inter-Element Matrix/Inter-Angle Matrix Difference

In view of the preceding description, the information contained in a windowed inter-element matrix is different from the information contained in a windowed inter-angle matrix.

Specifically, a windowed inter-element matrix corresponds to the time-domain responses of the receivers of a transmitter/receiver set following a succession of transmissions by transmitters of the transmitter/receiver assembly. Thus:

each row of a windowed inter-element matrix corresponds to a respective transmitter of the transmitter/receiver set, each column of a windowed inter-element matrix corresponds to a respective receiver of the transmitter/receiver set.

Contrariwise, and as will be described in more detail in the remainder of the text (see in particular point 4.3.1.3.), a windowed inter-angle matrix corresponds to the reception angles of the plane reception waves following a succession of plane transmission waves transmitted at different transmission angles. Thus:

each row of a windowed inter-angle matrix is representative of the transmission angle of a transmitted plane wave, and each column of a windowed inter-angle matrix is representative of a reception angle of a received plane wave.

Figure 7:
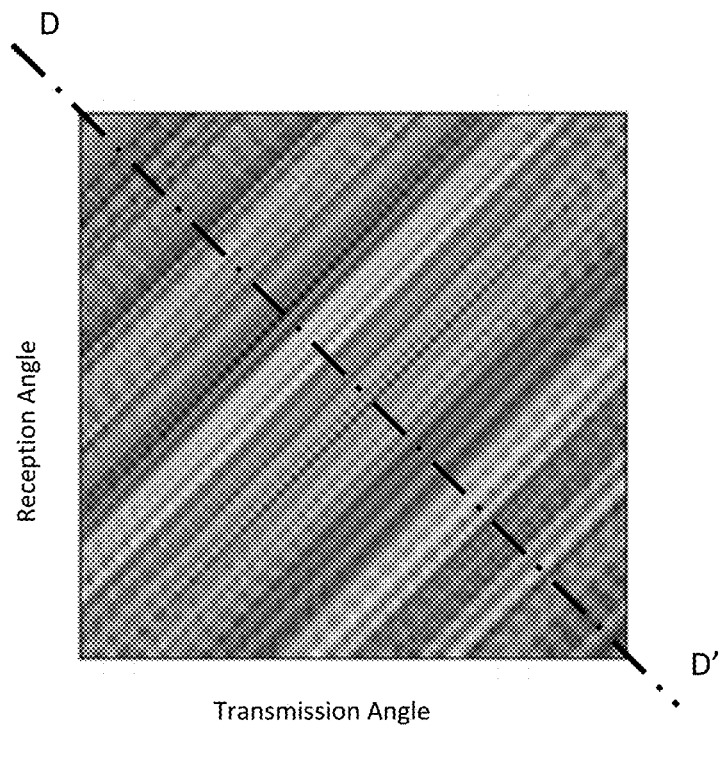
FIG. 7 illustrates a real part of a windowed inter-angle matrix.

By way of illustration, FIG. 7 illustrates the real part of a windowed inter-angle matrix.

Figure 1:
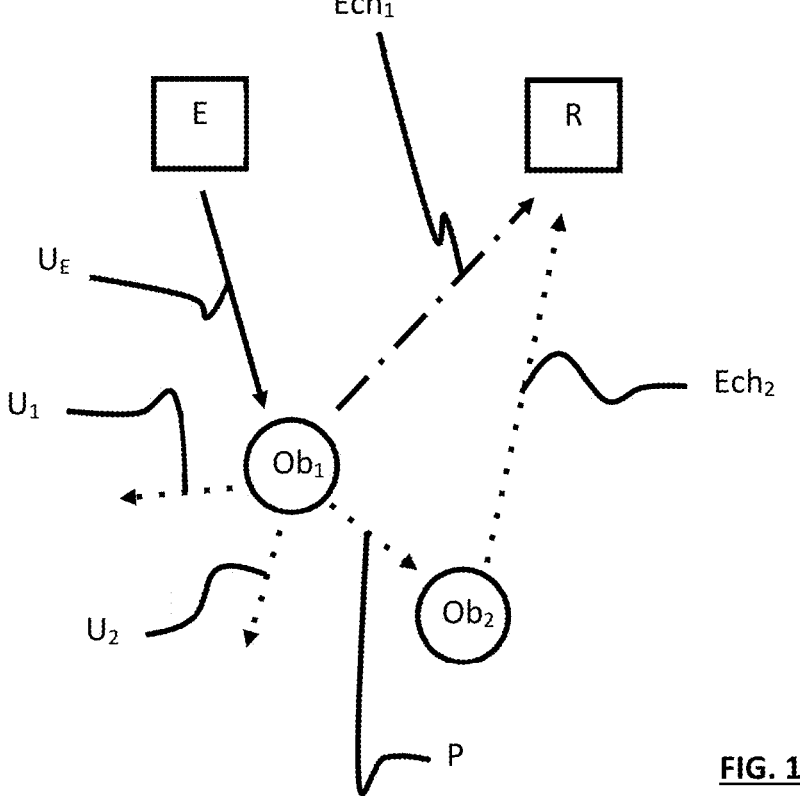
FIG. 1 is a schematic representation illustrating the principle of scattering of a wave.
Figures 2A, 2B, 2C, 2D:
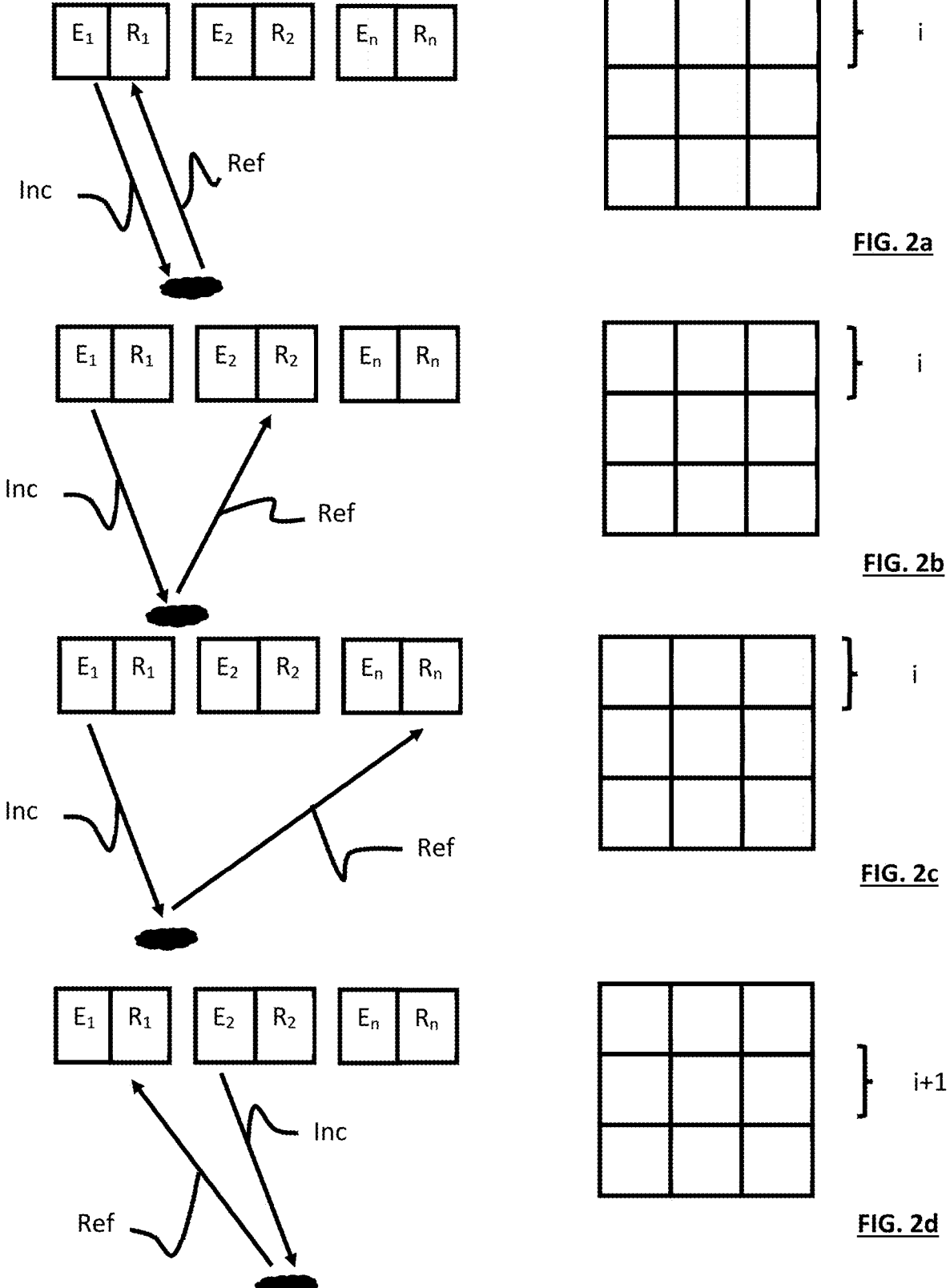
FIGS. 2a to 2d are schematic representations illustrating the principle of determination of an inter-element matrix.
Figure 3:
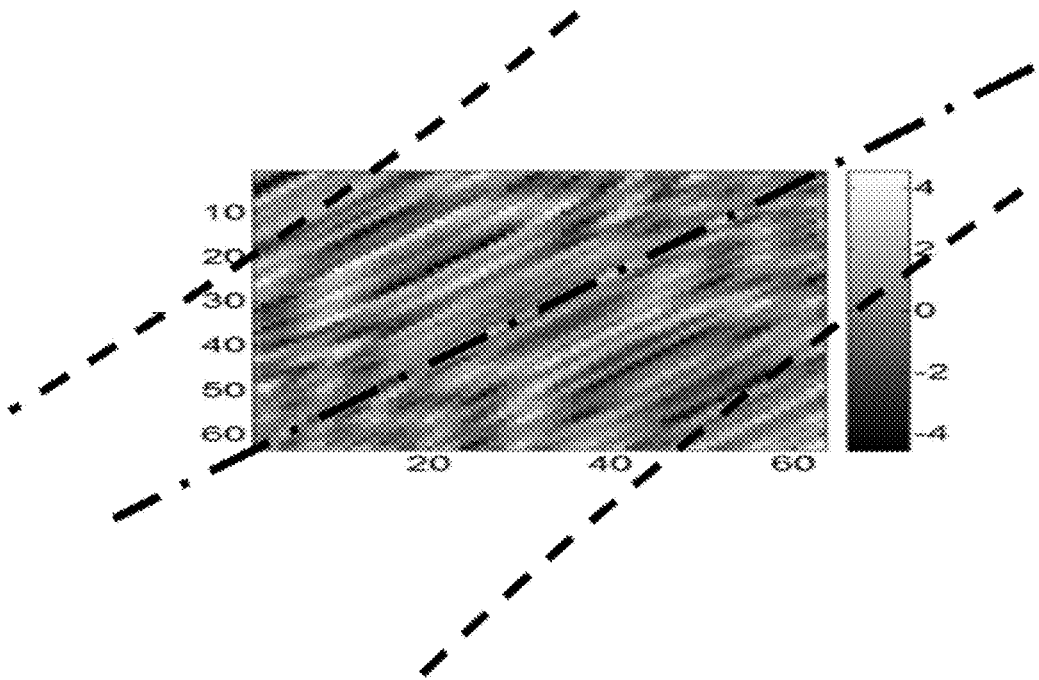
FIG. 3 illustrates a real part of an inter-element matrix.

The reader will notice on this figure that the antidiagonals are straight, unlike the antidiagonals of the real part of the windowed inter-angle matrix illustrated in FIG. 2 where the antidiagonals are curved.

This linearity of the antidiagonals of the windowed inter-angle matrix makes it possible hereinafter to improve the quality of separation of the single and multiple scattering components, and therefore the quality of the results obtained by comparison with the method described in WO 2010/001027.

3. SEPARATION OF THE SINGLE AND MULTIPLE SCATTERING COMPONENTS

The preceding steps make it possible to generate several windowed inter-angle matrices in each of which the single and multiple scattering contributions can be separated by filtering.

In each windowed inter-angle matrix K(T), this separation of the single and multiple components is done as a function of the coherence of the coefficients $K_{i,j}$ along each antidiagonal of said windowed inter-angle matrix K(T) under consideration. In the context of this invention the term "antidiagonal" should be understood to mean an alignment of coefficients $K_{i,j}$ of the matrix such that the sum "i+j" is constant ("i" corresponding to one row of the matrix, and "j" to one column of the matrix).

Specifically, the singly-scattered waves have a particular coherence along the antidiagonals of the windowed inter-angle matrix K(T), whereas the multiply-scattered waves do not have any preferred direction of coherence in the windowed inter-angle matrix K(T). This is why a filtering of the antidiagonals as a function of the coherence of the coefficients $K_{i,j}$ allows a separation of the single and multiple scattering components.

A description will now follow of various filtering methods that can be used to separate the single and multiple scattering components of each inter-angle matrix.

3.1. First Method of Separation by Single Value Decomposition

Figure 8:
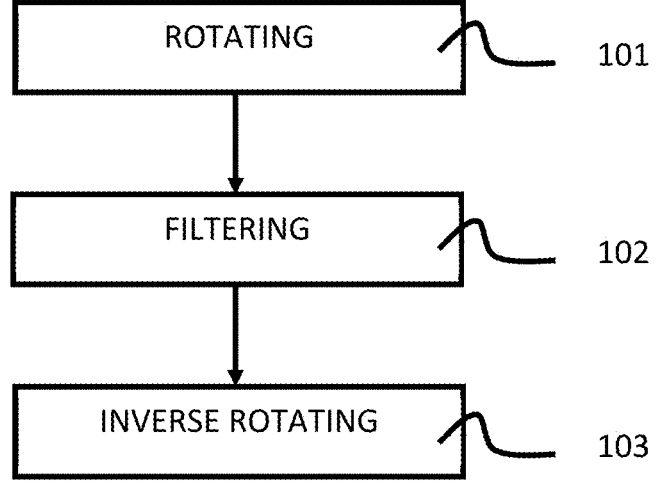
FIG. 8 is a schematic representation of the steps of a method of separation by single value decomposition, FIGS. 9a to 9d schematically illustrate a technique of rotation of a matrix by two-dimensional interpolation, FIG. 10 schematically illustrates a technique of rotation of a matrix by selection of coefficients.

With reference to FIG. 8, the first separation method comprises, for each windowed inter-angle matrix under consideration, the following steps:

rotating 101 the coefficients of the windowed inter-angle matrix K(T) by 45° to obtain one or more pivot matrices, and filtering 102 the pivoted matrix (or matrices) by single value decomposition to obtain one or more filtered matrices, inverse rotating 103 of the coefficients of the filtered matrix (or matrices) to generate:

a first filtered windowed inter-angle matrix, the coefficients of which are representative of the single scattering component, a second filtered windowed inter-angle matrix, the coefficients of which are representative of the multiple scattering component.

3.1.1. Rotation of the Coefficients of the Windowed Inter-Angle Matrix

Different techniques can be implemented to perform the step 101 of rotating the windowed inter-angle matrix:

a so-called two-dimensional interpolation technique, or a so-called technique of selection of the coefficients of the windowed inter-angle matrix along the antidiagonals.

These two techniques are described in detail below.

3.1.1.1. Two-Dimensional Interpolation

The step of rotation "by interpolation" is used to generate a pivoted matrix $K_{piv}(T)$. This technique can be used in the case of a sufficiently resolved inter-angle matrix.

The principle of construction of the pivoted matrix $K_{piv}(T)$ is as follows.

Figures 9A, 9B, 9C, 9D:
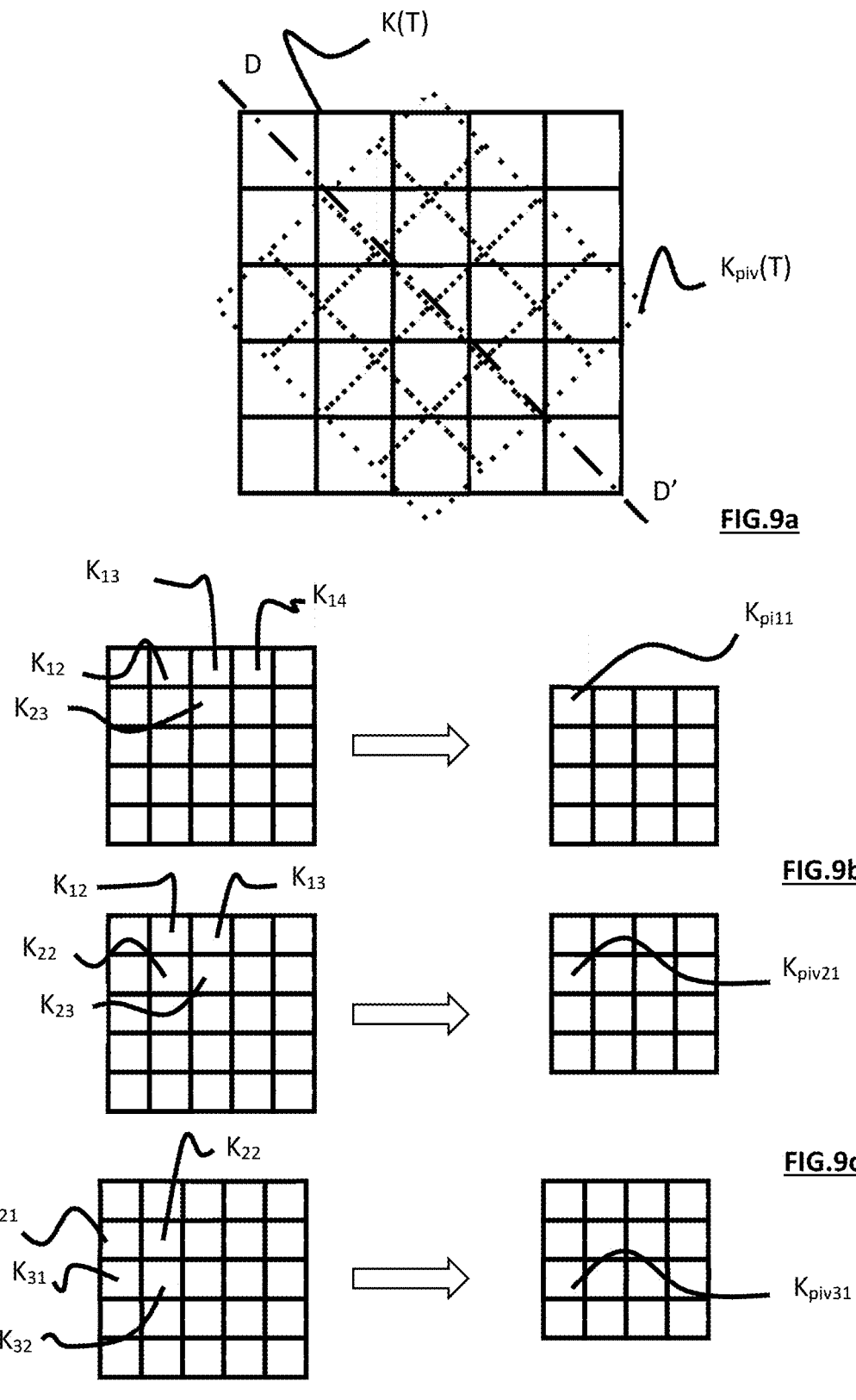

FIG. 9a illustrates a superimposition of the pivoted matrix $K_{piv}(T)$ on the windowed inter-angle matrix K(T).

The value of each coefficient of the pivoted matrix $K_{piv}(T)$ is determined by interpolation of the coefficients of the windowed inter-angle matrix K(T) in the vicinity of the coefficient under consideration in the pivoted matrix $K_{piv}(T)$.

More precisely, the value of the coefficient $K_{piv11}$ of the pivoted matrix $K_{piv}(T)$ is determined by interpolation of the four values $K_{12}$ $K_{13}$, $K_{14}$, $K_{23}$ of the windowed inter-angle matrix K(T), as illustrated in FIG. 9b. Similarly, the value of the central coefficient $K_{piv21}$ of the pivoted matrix $K_{piv}(T)$ is determined by interpolation of the four values $K_{12}$ $K_{13}$, $K_{22}$, $K_{23}$ of the windowed inter-angle matrix K(T), as illustrated in FIG. 9c. The value of the central coefficient $K_{piv31}$ of the pivoted matrix $K_{piv}(T)$ is determined by interpolation of the four values $K_{21}$, $K_{22}$, $K_{31}$, $K_{32}$ of the windowed inter-angle matrix K(T), as illustrated in FIG. 9d, and so on.

The reader will appreciate that the technique described above relates to the special case of a bilinear interpolation. Of course, other interpolation methods can be used.

3.1.1.2. Selection of the Coefficients of the Windowed Inter-Angle Matrix Along the Antidiagonals The step of rotation "by selection" of the coefficients of the windowed inter-angle matrix makes it possible to generate a pair of elementary matrices $K_{\acute{e}l1}(T)$, $K_{\acute{e}l2}(T)$.

Figure 10:
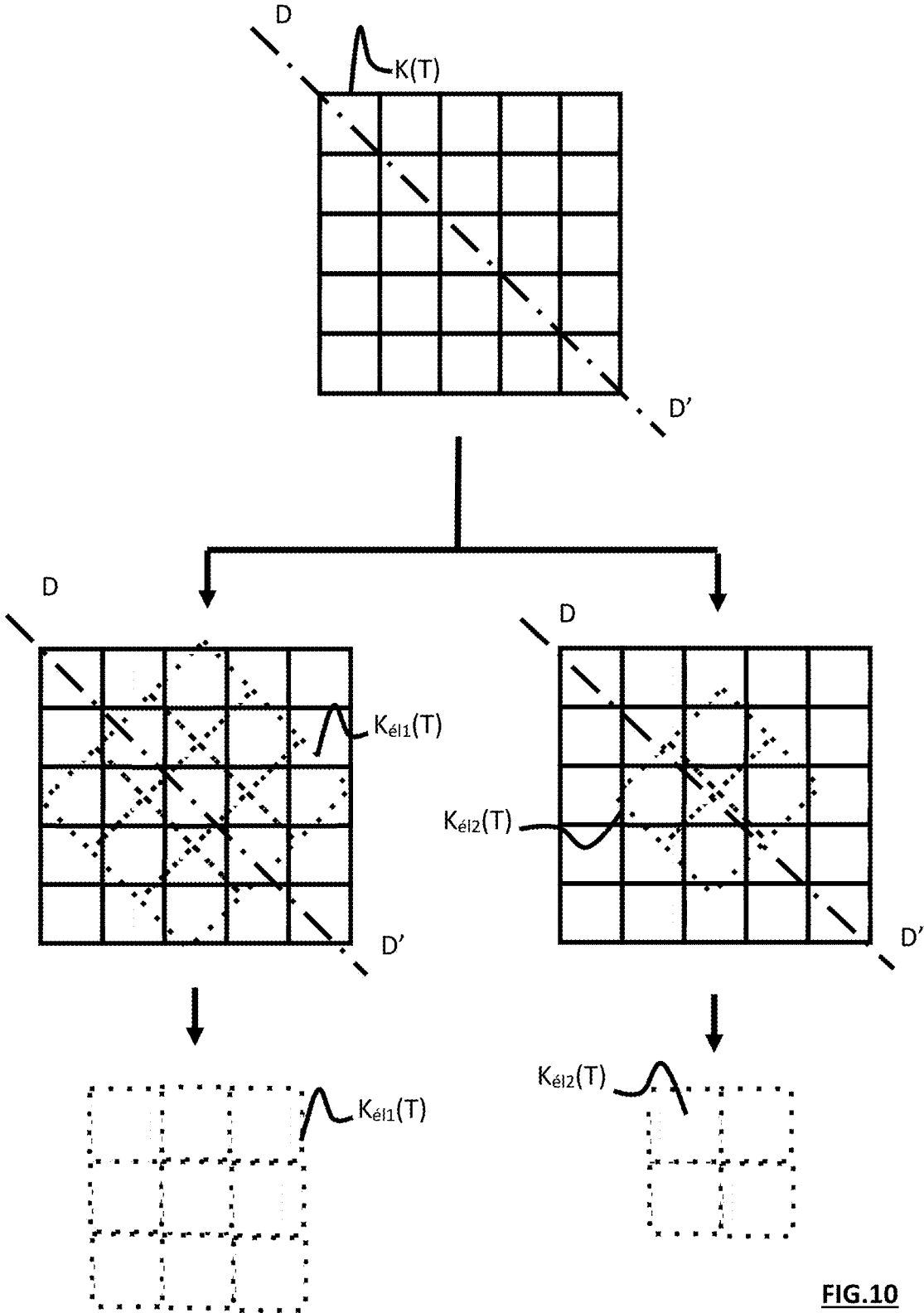

More precisely and with reference to FIG. 10, the elementary matrices $K_{él1}(T)$, $K_{él2}(T)$ are square matrices composed of sub-assemblies of the windowed inter-angle matrix K(T):

$K_{él1}(T)$ is a first square matrix of smaller dimensions than the windowed inter-angle matrix K(T), the rows of the first elementary matrix $K_{él1}(T)$ corresponding to first diagonals of the windowed inter-angle matrix K(T); for example, in the case of a 5×5 windowed inter-angle matrix K(T), the first elementary matrix $K_{él1}(T)$ is a 3×3 square matrix, each column of which corresponds to a respective odd-ranked diagonal of the windowed inter-angle matrix K(T);

$K_{él2}(T)$ is a second square matrix of smaller dimensions than the windowed inter-angle matrix K(T), the rows of the second elementary matrix $K_{él2}(T)$ corresponding to second diagonals of the windowed inter-angle matrix K(T); for example, in the case of a 5×5 windowed inter-angle matrix K(T), the second elementary matrix $K_{él2}(T)$ is a 2×2 square matrix, each column of which corresponds to a respective even-ranked diagonal of the windowed inter-angle matrix K(T).

More precisely, the coefficients "Coef1", "Coef2" of each elementary matrix $K_{él1}(T)$, $K_{él2}(T)$ are computed based on the coefficients "k" of the windowed inter-angle matrix K(T) with:

For the first elementary matrix $K_{él1}(T)$:

$Coef1_{x,y}(T) = K_{x+y-1,x-y+2M-1}(T)$, where M=(N+3)/4, N being chosen such that M is an integer, For the second elementary matrix $K_{él2}(T)$:

$Coef2_{x,y}(T) = K_{x+y,x-y+2M-1}(T)$, where M=(N+3)/4, N being chosen such that M is an integer.

One thus obtains two elementary matrices $K_{él1}(T)$, $K_{él2}(T)$ of respective dimensions Dim1 and Dim2, where:

Dim1=2M−1, and

Dim2—2M−2.

3.1.2. Filtering

The filtering step makes it possible to separate:

the contribution of the single scattering component, and the contribution of the multiple scattering component, by performing a Single Value Decomposition (or SVD).

The single value decomposition of a matrix makes it possible to decompose a matrix into to filtered matrices corresponding to two sub-spaces:

a first filtered matrix (corresponding to a so-called "signal" space) of determinative appearance, the columns of which are strongly correlated, a second filtered matrix (corresponding to a so-called "aberration" space) of random appearance, the coefficients of which are not correlated.

In the context of this invention, the term "aberration" should be understood to mean any phenomenon which is not expected in a single scattering model, i.e. a model where the received signals are exclusively composed of the signals directly reflected by the medium. The aberrations therefore include, inter alia, the thermal noise of the system and multiple scattering.

More precisely, a matrix M (M may correspond to the pivoted matrix $K_{piv}(T)$ or to one of the elementary matrices $K_{él1}(T)$, $K_{él2}(T)$) can be considered as being the sum of two terms $M^S$ and $M^M$ respectively denoting the contribution due to the single scattering component and the contribution due to the aberration component:

$$M = M^S + M^M,$$

That is to say:

in the case of the pivoted matrix $K_{piv}(T)$: $K_{piv}(T) = K_{piv}^S(T) + K_{piv}^M(j)$, in the case of the first elementary matrix $K_{él1}(T)$: $K_{él1}(T) = K_{él1}^S(T) + K_{él1}^M(T)$, in the case of the second elementary matrix: $K_{él2}(T) = K_{él2}^S(T) + K_{él2}^M(T)$.

The single value decomposition of the matrix M is written as follows:

$$M = U\Lambda^t V^* = \sum_{i=1}^{Dim} \lambda_i U_i V_i^*$$

where U and V are square unit matrices of dimension Dim, V* is the conjugate transpose of V, and their respective columns $U_i$ and $V_i$ corresponding to the eigenvectors associated with the singular value $\lambda_i$.

The single scattering being characterized, after rotation of the data, by a high degree of coherence along the columns of the elementary matrices, the single value decomposition makes this contribution apparent in the signal space (the single scattering contribution will be associated with the highest single values) whereas the contribution of the aberration will be associated with the lowest single values.

In certain variant embodiments, the single value of rank 1 can be enough to separate the signal space (associated with the single scattering) from the aberration space (associated with the multiple scattering). In other embodiments, several single values (bearing the mark of the contribution associated with the single scattering component) can be computed to separate the signal space from the aberration space.

Whatever the circumstances, the single value decomposition(s) of the single scattering contribution is then subtracted from the initial matrix (i.e. before single value decomposition). The result of this subtraction operation is a matrix representative of the contribution of the multiple scattering component.

Thus, the single value decomposition method makes it possible to:

based on the pivoted matrix $K_{piv}(T)$, obtain first and second filtered matrices $K_{piv}^S(T)$ and $K_{piv}^M(T)$ containing the single and multiple scattering contributions respectively, based on the first elementary matrix $K_{él1}(T)$, obtain first and second filtered matrices $K_{él1}^S(T)$ and $K_{él1}^M(T)$ containing the single and multiple scattering contributions respectively, based on the second elementary matrix $K_{él2}(T)$, obtain first and second filtered matrices $K_{él2}^S(T)$ and $K_{él2}^M(T)$ containing the single and multiple scattering contributions respectively.

3.1.3. Inverse Rotation of the Coefficients of the Filtered Matrices

An inverse rotation is then implemented on the different filtered matrices obtained in the preceding step to reorient their coefficients according to the orientation of the initial windowed inter-angle matrix K(T) (i.e. inverse transformation of the transformation described in point 3.1.1).

More precisely, each filtered matrix $G_{filtrée}$ ($G_{filtrée}$ may correspond to $K_{piv}^S(T)$, $K_{piv}^M(T)$, $K_{él1}^S(T)$, $K_{él1}^M(T)$, $K_{él2}^S(T)$, or $K_{él2}^M(T)$) is rotated to obtain a matrix $G_{tournée}$ by applying the following rule:

when x-y is even: $A^{Gtournée}_{x,y}(T) = a^{Gfiltrée}_{(x-y)/2+M,(x+y)/2}$ when x-y is odd: $A^{Gtournée}_{x,y}(T) = a^{Gfiltrée}_{(x-y-1)/2+M,(x+y-1)/2}$.

3.2. Second Method of Separation by Projection onto the Hankel Space

In a variant to the first method of separation by single value decomposition, a second method of separation by projection onto the Hankel space can be implemented.

The Hankel space is a vector subspace of the space of square matrices which is defined in that all the matrices of the Hankel space have their antidiagonals constant.

This second method of projection onto the Hankel space is advantageously performed on the unrotated windowed inter-angle matrix K(T), i.e. this method does not require a rotation of the windowed inter-angle matrix K(T) and uses all the coefficients of this matrix, whereas a rotation reduces the number of available coefficients.

The second Hankel separation method consists in separating the windowed inter-angle matrix K(T) into a Hankel matrix H(T) and a residual matrix R(T). A Hankel matrix is a square matrix, the values of which are constant along the antidiagonal (i.e. ascending diagonals), i.e. a matrix, the indices of which verify the relationship:

$$H_{x,y} = H_{x-1,y+1}$$

To compute a Hankel matrix H(T) based on the windowed inter-angle matrix K(T), the simplest solution is to perform an orthogonal projection onto the Hankel space. This solution consists in replacing each coefficient $h_{x,y}$ or an antidiagonal of the Hankel matrix H(T), with the average of the corresponding coefficients $k_{l,m}$ of the windowed inter-angle matrix K(T) over said antidiagonal. More precisely, each coefficient $h_{x,y}$ of the Hankel matrix H(T) is determined according to the following formula:

$$H_{x,y}(T) = \langle K_{l,m} \rangle_{l,m;l+m=x+y}$$

The Hankel matrix H(T) thus obtained is representative of the single scattering component. The remainder "K(T)–H(T)" is representative of the multiple scattering component.

More precisely, to obtain the matrix R(T) representative of the multiple scattering component, the Hankel matrix H(T) is subtracted from the windowed inter-angle matrix K(T):

$$R(T) = K(T) - H(T).$$

The second Hankel method has the advantage of limiting the number of computations made (and therefore the amount of hardware resources needed) to separate the single and multiple scattering components contained in the windowed inter-angle matrix K(T). This is because it is not necessary to perform the operations of rotation and inverse rotation, unlike the first method of separation by single value decomposition.

4. THEORY RELATING TO THE INVENTION

An explanation will now follow of different theoretical elements relating to the invention, to allow those skilled in the art to better understand the advantages associated with the method described above.

4.1. Objective

In the remainder of the text, a method of aberration quantification by angular approach will be described. Here, the term "aberrations" refers to all phenomena that are not expected in a single scattering model, i.e. a model in which the received signals are exclusively composed of the signals directly reflected by the medium.

The aberrations therefore comprise, inter alia, the thermal noise of the system and multiple scattering (i.e. obtained signal consists of the echoes of waves reflected by several elements of the medium before returning to the probe).

This quantification will be carried out by processing signals received in the context of the transmission and reception of plane or spiral waves. Specifically, the mathematical and physical formulation of the problem in this case allows for a simple analysis and the design of a method of mapping of the aberrations.

The technique of quantification of the aberrations by the angular approach, proposed in this part, can be separated into two steps:

a first step comprising:
- a sub-step of transmitting wave beams obtained by applying a delay law on the elements of the strip of transducers; these beams approximate a base of progressive plane transmission waves, i.e. propagating toward the imaged medium; thus, in the remainder of the text, the terms "plane wave" or "plane transmission wave" will be used to describe the ultrasound wavefront propagating through the imaged medium;
- a sub-step of receiving, on the elements, signals representative of the reverberation of the ultrasound waves by the insonificated medium,
- a processing sub-step for decomposing the signals received on the elements on a base of gradual plane reception waves, i.e. propagating toward the transducer strip, a second processing step exploiting the redundancy of the angular data to separate the single scattering component from the aberrations.

4.2. First Step: Transmission/Reception of Plane Waves

This part describes the method used to transmit and receive plane waves using an ultrasound wave composed of a set of ultrasound transducers. These transducers are typically arranged uniformly along a straight line, defining a linear probe, or a semicircle, defining a curved probe.

4.2.1. Transmission

To transmit a plane wave with a set of transducers, it is enough to transmit with all the transducers while applying a delay to each element independently as a function of the time at which the desired wavefront passes through the position of said element.

For example, to transmit a plane wave of angle α with a linear probe in which the elements are uniformly distributed at the positions (ip,0), i∈{0,n−1}, "p" being the pitch in meters and "n" the number of transducers of the probe, it is enough to apply to the transducer "i" the delay $\tau_i=i*p*\sin(\alpha)/c$, where "c" is the speed of sound in the medium.

4.2.2. Reception

Directly after having transmitted the desired wave with the ultrasound transducers, the signals received by each of these same elements, coming from the reverberation of the ultrasound waves by the imaged medium, is recorded. Thus, for each element, a signal which is a function of time $\{s_i(t)\}_{0\leq i\leq n-1}$ corresponding to the response of the medium to the transmitted wave is obtained.

4.2.3. Processing

Just as it is possible to synthesize a plane transmission wave with a set of elements, it is possible to synthesize a plane reception wave. To do this, the signals received by elements are delayed and summed, with a delay depending on the angle of the desired plane reception wave.

For example, to receive a plane wave of angle $\alpha$ based on the signals $\{s_i(t)\}_{0 \leq i \leq n-1}$ received by the transducers, the following operation can be performed:

$$\widehat{s_\alpha}(t) = \sum_{i=0}^{n-1} s_i(t - \tau_i), \text{ where } \tau_i = ip\sin\alpha/c.$$

This processing step thus allows access to a set of signals $\{s_{\alpha j, \beta k}(t)\}_{1 \leq j \leq N\alpha, 1 \leq j \leq N\beta}$, corresponding to Na synthesized angles in transmission mode and $N_\beta$ synthesized angles in reception mode.

4.3. Second Step: Quantification of Aberrations

The quantification of aberrations requires the separation of the signal from single scattering by the medium from the remainder (multiple scattering, noise etc.) This separation is possible in the angular domain by exploiting the high degree of redundancy of the signals from the single scattering.

4.3.1. Principle

This part will be detailed for the simplest scenario, that of the transmission and reception of plane waves by a linear probe. Such a reasoning can be generalized to cover other geometries and other transmissions after making a few approximations.

4.3.1.1. Physical Interpretation of the Angular Signal

When a plane wave of angle $\alpha$ is transmitted, the reception of a plane wave of angle $\beta$ gives the signal $s_{\alpha,\beta}(t)$. Assuming single scattering, it is possible to prove that this signal at the time t corresponds to the sum of the signals reflected by all the scatterers of the medium positioned along a line forming an angle $(\alpha+\beta)/2$ with the horizontal.

Specifically, if an impulse plane wave of angle $\alpha$ is transmitted, it will reach the point (x, z) at the time t=1/c*(x sin $\alpha$+z cos $\alpha$). This wave will be reflected by the point (x, z), and, if a plane wave of angle $\beta$ is received, the signal reflected by this point will arrive at the time t=1/c*(x sin $\alpha$+z cos $\alpha$+x sin $\beta$+z cos $\beta$), which can be simplified to t=2 cos(($\alpha$-$\beta$)/2)*(x sin $\gamma$+z cos $\gamma$)/c, where y=($\alpha$+$\beta$)/2. The signal received at time t in this configuration therefore corresponds to all the points (x, z) which verify the relationship t=2 cos(($\alpha$-$\beta$)/2)*(x sin $\gamma$+z cos $\gamma$)/c. These points are located on a straight line forming an angle $\gamma$ with the horizontal.

Reciprocally, to obtain the sum of the signals along the line of angle y and of depth z, based on the transmission of a wave of angle $\alpha$, it is enough to synthesize the plane wave of angle 2$\gamma$-$\alpha$ in reception mode and observe the signal $s_{\alpha,2\gamma-\alpha}$(z(cos $\alpha$+cos $\beta$)/c).

4.3.1.2. Redundancy of Information

Thus, if several plane waves with different angles $\alpha_i$, i$\in$\{1, N$\alpha$\} are transmitted, it is possible, for each transmission, to choose to receive the plane wave of angle $\beta_i$=2$\gamma$-$\alpha_i$ in order to observe the same line of angle $\gamma$. In this way a vector corresponding to this line for N pairs of transmission/reception angles can be accessed.

Formally, this vector can be modeled as follows: s=$[s_1, \ldots s_{N\alpha}]^T \in C^{N\alpha}$, where $s_i$=s+$\epsilon_i$, with s corresponding to the single scattering component and $\epsilon_i$ taking into account the aberrations.

Specifically, in the context of the single scattering model, this vector is a constant vector since it is systematically the same reflections which are observed.

4.3.1.3. Matrix Structure

In practice, a number Na of transmissions is made, and a number $N_\beta$ of angular receptions is computed for each transmission. Thus, one obtains an inter-angle matrix of dimension $N_\alpha \times N_\beta$. If the angles transmitted and the angles received are identical and regular (spaced apart by a constant pitch), one obtains a matrix of size $N_\alpha \times N_\alpha$ for which the coefficient $k_{i,j}$ corresponds to the signal received for a transmission of angle $\alpha_i$ and a reception of angle $\alpha_j$.

In addition, along the antidiagonals (i.e. ascending diagonals), with i+j being constant, $(\alpha_i+\alpha_j)/2$ is too. According to the previous paragraphs, antidiagonals are obtained along which the single scattering component is theoretically constant.

4.3.2. Processing

Two methods of separation of the single scattering from the aberrations will be explained. The first uses the matrix structure of the acquired data to apply linear algebra results and random matrix theory thereto. The second, simpler, makes direct use of the redundancy of the information on the antidiagonals.

4.3.2.1. Single Value Decomposition Method

The single value decomposition method uses the fact that a matrix which has constant columns is a matrix of rank 1. To use this property, several steps are necessary:

i) Firstly, the inter-angle matrix, expressed in the time or frequency domain, is pivoted by 45° so that the antidiagonals become columns; several techniques are possible for this step:

a. Two-dimensional interpolation of the elements; this method is valid for a sufficiently resolved inter-angle matrix, b. Selection of the elements of the matrix K along the antidiagonals; this method requires the selection of two matrices, and processing on these two matrices in parallel, ii) Once the rotation has been made, a SVD (Singular Value Decomposition) is applied; the SVD makes it possible to extract the eigenvalues of the matrix with the corresponding eigenvectors; as the matrix possesses constant columns in the context of single scattering, its rank must be 1 and it must possess a single non-zero eigenvalue; single scattering is therefore assumed to be present solely in the first eigenvector, iii) The first eigenvector is therefore separated from the others, giving rise to two matrices, one representing the single scattering and the other the aberrations; the Euclidian norm of the eigenvalues incidentally allows the extraction of a ratio of single scattering to aberrations.

In practice, it is possible to select more than one eigenvector to compensate for the deterministic effects not taken into account in the theory, such as probe diffraction or directivity effects.

4.3.2.2. Hankel Method

This method is performed directly with the unrotated inter-angle matrix. In this case, the aim is to separate the inter-angle matrix into a Hankel matrix (i.e. a matrix having its antidiagonals constant) and a residual matrix.

To do this, the orthogonal projection operator is used on the Hankel matrix space, which consists in taking the average over each antidiagonal of K:

$$H_{i,j} = \langle K_{l,m} \rangle_{l,m;l+m=i+j}$$

This matrix H (T) corresponds to the single scattering, and the remainder K–H to the aberrations.

4.4. Use of Filtered Matrices

The preceding methods give access to a single scattering matrix and an aberration matrix.

If one assumes that the aberrations only comprise multiple scattering, the norm of these matrices is an indicator of the quantity of single scattering and of the quantity of multiple scattering, and therefore also of the multiple scattering to single scattering ratio.

5. CONCLUSIONS

In the preceding description, the invention was described in scenario where plane waves are used. The reader will appreciate that the invention can be implemented using other types of highly directive waves, such as spiral waves.

Also in the preceding description, the invention was described with reference to a transducer array $T_1$-$T_n$ with linear geometry. It is obvious to those skilled in the art that the transducer array $T_1$-$T_n$ can have other shapes such as a curved or matrix shape.

In the scenario of a matrix, and thus two-dimensional, probe, the preceding method is generalized by defining two-dimensional plane or spiral waves. These plane or spiral waves are nothing less than the combination of a plane wave or spiral wave along an axis with a plane or spiral wave along another axis, thus giving delay laws defined in Cartesian, cylindrical or polar frames of reference.

In the context of this invention, the term "virtual transducer array" should be understood to mean a set of points defining a geometrical shape chosen as a function of delay laws applied to the real transducer array such that said points of the set transmit a plane or spiral wavefront.

The invention claimed is:

1. A method for analyzing a medium based on a transducer array, wherein the method comprises the following phases:
   generating in a scattering medium, by transducers of the transducer array, a transmission wave having a desired transmission angle,
   receiving, by transducers of the transducer array, reverberated signals and their combinations to obtain reception signals representative of several reception waves reflected by the scattering medium at respective reception angles, each reception signal comprising:
      a single scattering component, representative of wave paths resulting from a single reflection of the transmission wave off a scatterer of the scattering medium,
      a multiple scattering component, representative of wave paths resulting from several successive reflections of the transmission wave off scatterers of the scattering medium before reaching the transducers of the transducer array,
   repeating the generating and receiving steps for a plurality of transmission waves, each having an associated transmission angle, processing the reception signals to determine features of the medium, the processing phase comprising a step of separating the single scattering component and the multiple scattering component in said reception signals, said separating step including the following sub-steps:
      determining at least one windowed inter-angle matrix in which each row is representative of the transmission angle of a plane transmission wave and each column is representative of the reception angle of a plane reception wave,
      filtering the at least one windowed inter-angle matrix to separate the single scattering component and the multiple scattering component in each reception signal.

2. The analyzing method as claimed in claim 1, wherein each generating step comprises the sub-step consisting in:
   activating in transmission mode the transducers of the transducer array according to a respective activation delay law, such that each transducer transmits an elementary ultrasound wave at a respective time as a function of said activation delay law, said elementary ultrasound waves combining to form the transmission wave having the desired transmission angle, the transmission angle of the transmission wave depending on the activation delay law used.

3. The analyzing method as claimed in claim 1, wherein each receiving step comprises the sub-steps consisting in:
   activating in reception mode the transducers of the transducer array according to a respective activation delay law, such that each transducer records an elementary received signal corresponding to a portion of the reception wave having a desired reception angle, the desired reception angle depending on the activation delay law used,
   combining the elementary received signals to form a reception signal corresponding to the desired reception wave.

4. The analyzing method as claimed in claim 1, wherein each receiving step comprises the following sub-steps:
   simultaneously activating the transducers in reception mode, each transducer recording a sensed signal representative of several waves reverberated by the medium,
   combining the sensed signals according to different time delay laws to form reception signals representative of the reception waves, said sub-step consisting in combining the signals comprising, for each reception signal representative of a desired reception wave:
      for each sensed signal, time-shifting the sensed signal as a function of a time delay law to obtain a shifted signal, each time delay law used being associated with a respective desired reception angle,
      summing the shifted signals to obtain the reception signal representative of the desired reception wave.

5. The analyzing method as claimed in claim 1, wherein the separating step includes a sub-step of filtering at least one windowed inter-angle matrix representative of the transmission and reception angles of the transmission and reception waves:
   each row of the windowed inter-angle matrix being representative of the transmission angle of a transmission wave, and
   each column of the windowed inter-angle matrix being representative of a reception angle of a reception wave.

6. The analyzing method as claimed in claim 5, wherein the separating step further comprises the following substeps:

determining a plurality of windowed inter-angle matrices, each windowed inter-angle matrix corresponding to a time matrix defining, over a time window in the vicinity of a time T and of duration Δt, pairs of transmission and reception angles of waves, then for each windowed inter-angle matrix:

estimating a first resultant inter-angle matrix representative of the single scattering component, estimating a second resultant inter-angle matrix representative of the multiple scattering component.

7. The analyzing method as claimed in claim 6, wherein for each windowed inter-angle matrix:

the sub-step of estimating a first resultant inter-angle matrix representative of the single scattering component consists in computing a Hankel matrix based on the windowed inter-angle matrix under consideration, said Hankel matrix having constant coefficients along each ascending antidiagonal, the sub-step of estimating a second resultant inter-angle matrix representative of the multiple scattering component consists in subtracting the estimated Hankel matrix from the windowed inter-angle matrix.

8. The method as claimed in claim 7, wherein the Hankel matrix consists in a single matrix having the most similarities, according to a Frobenius norm, with the windowed inter-angle matrix under consideration.

9. The method as claimed in claim 6, wherein for each windowed inter-angle matrix, the sub-steps of estimating the first and second resultant inter-angle matrices comprise the filtering of the windowed inter-angle matrix under consideration as a function of the coherence of the coefficients along each ascending diagonal matrix of said windowed inter-angle matrix under consideration.

10. The method as claimed in claim 9, wherein the filtering of the windowed inter-angle matrix under consideration comprises:

the rotation of the inter-angle matrix by an angle of 45° to obtain at least one pivoted matrix, the decomposition into at least one singular value of each pivoted matrix to obtain a decomposed matrix, the subtraction of the decomposed matrix from said pivoted matrix to obtain a subtracted matrix, the inverse rotation of the decomposed matrix by an angle of −45° to obtain the first resultant inter-angle matrix representative of the single scattering component, the inverse rotation of the subtracted matrix by an angle of −45° to obtain the second resultant inter-angle matrix representative of the multiple scattering component.

11. The method as claimed in claim 3, wherein the transducer array comprises a plurality of transducers extending along at least one row such as to have a substantially plane shape:

the wave generated during the generating step consisting in a plane wave, the signals combined during the receiving step being representative of plane reception waves, each activation delay law consisting in a linear delay law applied to the transducers extending along the at least one row.

12. The method as claimed in claim 3, wherein the transducer array comprises a plurality of transducers extending along at least one radius of curvature such as to have a convex shape:

the wave generated during the generating step consisting in a spiral wave, the signals combined during the receiving step being representative of spiral reception waves, each activation delay law consisting in a linear delay law applied to the transducers extending along the at least one radius of curvature.

* * * * *